US010787595B2

(12) United States Patent
Robert

(10) Patent No.: US 10,787,595 B2
(45) Date of Patent: Sep. 29, 2020

(54) EXTRUDABLE HOT-MELT PRESSURE-SENSITIVE ADHESIVES FOR RESEALABLE PACKAGING HAVING IMPROVED ORGANOLEPTIC PROPERTIES

(71) Applicant: BOSTIK SA, La Plaine Saint Denis (FR)

(72) Inventor: Christophe Robert, Thourotte (FR)

(73) Assignee: BOSTIK SA, La Plaine Saint Denis (FR)

( * ) Notice: Subject to any disclaimer, the term of this patent is extended or adjusted under 35 U.S.C. 154(b) by 0 days.

(21) Appl. No.: 14/792,973

(22) Filed: Jul. 7, 2015

(65) Prior Publication Data

US 2016/0009965 A1    Jan. 14, 2016

(30) Foreign Application Priority Data

Jul. 8, 2014  (FR) ...................................... 14 56561

(51) Int. Cl.
| | | |
|---|---|---|
| *C09J 153/02* | (2006.01) | |
| *B65D 65/40* | (2006.01) | |
| *B32B 27/08* | (2006.01) | |
| *B65D 77/20* | (2006.01) | |
| *B32B 27/30* | (2006.01) | |
| *B32B 27/36* | (2006.01) | |
| *B32B 27/34* | (2006.01) | |
| *C09J 7/38* | (2018.01) | |
| *B29C 49/04* | (2006.01) | |
| *B29C 49/22* | (2006.01) | |
| *B32B 7/12* | (2006.01) | |
| *B32B 27/32* | (2006.01) | |
| *B29K 23/00* | (2006.01) | |
| *B29K 25/00* | (2006.01) | |
| *B29L 7/00* | (2006.01) | |
| *B29L 9/00* | (2006.01) | |

(52) U.S. Cl.
CPC ............. *C09J 153/02* (2013.01); *B29C 49/04* (2013.01); *B29C 49/22* (2013.01); *B32B 7/12* (2013.01); *B32B 27/08* (2013.01); *B32B 27/302* (2013.01); *B32B 27/306* (2013.01); *B32B 27/308* (2013.01); *B32B 27/32* (2013.01); *B32B 27/34* (2013.01); *B32B 27/36* (2013.01); *B65D 65/40* (2013.01); *B65D 77/20* (2013.01); *C09J 7/387* (2018.01); *B29K 2023/0633* (2013.01); *B29K 2025/04* (2013.01); *B29L 2007/008* (2013.01); *B29L 2009/00* (2013.01); *B32B 2250/24* (2013.01); *B32B 2307/54* (2013.01); *B32B 2439/70* (2013.01)

(58) Field of Classification Search
CPC ....... C09J 7/0221; C09J 153/02; C08L 53/02; B32B 2439/70
See application file for complete search history.

(56) References Cited

U.S. PATENT DOCUMENTS

| 4,731,395 | A | * | 3/1988 | Byrne ................... C08G 61/06 512/4 |
| 4,943,459 | A | * | 7/1990 | Nedzu ..................... B32B 27/08 428/36.5 |
| 6,025,071 | A | * | 2/2000 | Cameron .............. C08L 53/025 428/355 BL |
| 6,458,902 | B1 | | 10/2002 | Okazaki et al. |
| 8,703,263 | B2 | | 4/2014 | Goubard |
| 2002/0014307 | A1 | * | 2/2002 | Hidaka ................ A61K 9/7061 156/327 |
| 2011/0162782 | A1 | | 7/2011 | Goubard |
| 2013/0233911 | A1 | * | 9/2013 | Robert .................... B32B 27/08 229/5.84 |
| 2014/0024513 | A1 | | 1/2014 | Robert et al. |
| 2015/0299535 | A1 | | 10/2015 | Robert |

FOREIGN PATENT DOCUMENTS

| EP | 1035143 B1 | | 7/2005 |
| EP | 2687362 A1 | | 1/2014 |
| FR | 2965213 A1 | | 3/2012 |
| JP | 2000103820 A | | 4/2000 |
| JP | 200838057 A | | 2/2008 |
| JP | 2008274257 A | | 11/2008 |
| WO | 2010012906 A1 | | 2/2010 |
| WO | WO 2012/045951 | * | 4/2012 |
| WO | WO 2014/020243 | * | 2/2014 |

OTHER PUBLICATIONS

Notteau et al., electronic translation of WO/2012/045951, Apr. 2012.*
Search Report dated Feb. 24, 2015 issued in corresponding application FR 14.56561 (pp. 1-2).
Notice of Reasons for Refusal in corresponding Japanese Patent Application No. 2015-132447 dated Jul. 9, 2019 (pp. 1-4).

* cited by examiner

*Primary Examiner* — Jeffrey C Mullis
(74) *Attorney, Agent, or Firm* — Millen White Zelano and Branigan, PC; Csaba Henter

(57) ABSTRACT

1) Hot-melt pressure-sensitive adhesive composition with MFI of 0.01 to 200 g/10 minutes and comprising:
   from 45 to 70% by weight of a composition of styrene block copolymers of SIS type with an SI diblock content of 30 to 90% and a content of styrene units of 10 to 40%; and
   from 30 to 55% by weight of at least one tackifying resin having a softening temperature of between 5 and 150° C., and obtained by a process comprising:
   a first stage of polymerization of:
   a composition (i) essentially composed of unsaturated hydrocarbons having 9 carbon atoms, or
   a composition (ii) essentially composed of dicyclopentadiene and of its derivatives having 10 carbon atoms; then
   a second stage of hydrogenation of the polymer thus obtained.

19 Claims, No Drawings

EXTRUDABLE HOT-MELT PRESSURE-SENSITIVE ADHESIVES FOR RESEALABLE PACKAGING HAVING IMPROVED ORGANOLEPTIC PROPERTIES

A subject-matter of the present invention is a novel extrudable hot-melt pressure-sensitive adhesive composition and also a multilayer film intended for the manufacture of resealable packagings (or cartons), which comprises an adhesive layer composed of the said composition and which exhibits improved organoleptic properties.

Extrudable hot-melt pressure-sensitive adhesive compositions intended for use for the manufacture of resealable packagings (or cartons) are known in particular by Applications WO 02/064694, WO 12/045950 and WO 12/045951.

Resealable cartons are used in the food processing industry and mass marketing for packaging foodstuffs, in particular fresh products. Such packagings are described by U.S. Pat. No. 4,673,601 and Patent Application EP 1053952.

After the packaging has been opened for the first time and a portion of the foodstuff present therein has been consumed, the consumer can manually reseal the packaging in a substantially hermetic fashion and consequently provide, if appropriate after placing in a refrigerator, the storage of the remaining portion of the foodstuff. A sequence of reopenings and resealings is also possible.

These packagings generally comprise a container (or receptacle) and a seal forming a lid, which are hermetically attached to one another by welding.

The receptacle, which is more or less deep and relatively rigid, is composed of a multilayer sheet (also described as complex or composite sheet) having a minimum thickness of 200 µm, generally between 200 and 1000 µm. This sheet is thermoformed, so as to exhibit a flat bottom, on which the foodstuff rests, and a perimeter in the form of a flat band. This perimeter, generally parallel to the bottom, is bonded by welding to the flexible and flat seal, which is composed of a multilayer film (also described as complex or composite film), generally with a thickness of between 40 and 150 µm, and which is sometimes denoted by the name of sealing film.

During the opening of the packaging, the sealing film is manually separated from the receptacle at the flat band of the perimeter. This operation results in the appearance of an adhesive layer at this flat band, both on the sealing band and on the receptacle band which were previously in contact. These two adhesive layers (continuous or noncontinuous) referred to as "daughters" result from the rupturing of an initial or "mother" adhesive layer or, possibly, from its separation (or detachment) from one of the two layers of the multilayer complex film which are adjacent to it. The initial adhesive layer is thus one of the layers of the said multilayer complex film, which is itself an element included either in the composite sheet which forms the receptacle or, optionally, in the sealing film.

The two daughter adhesive layers which are present, after opening the packaging, on the bands located on the respective perimeter of the receptacle and of the seal are thus facing one another. Thus, it is sufficient to reposition the seal over the receptacle, in accordance with their position in the packaging before opening, in order to bring the two bands of daughter adhesive layers back into contact. Simple manual pressure then makes it possible to obtain the resealing of the packaging.

The adhesive composition which forms the mother and daughter adhesive layers is thus necessarily a pressure-sensitive adhesive (PSA).

The extrudable pressure-sensitive adhesive compositions described in the abovementioned patent applications are hot-melt compositions comprising a tackifying resin and a styrene block copolymer including an elastomer block. These are substances, solid at ambient temperature, which comprise neither water nor solvent. Applied in the molten state, they solidify when they are cooled, thus forming an adhesive layer which provides the bonding between the two thin layers of thermoplastic polymer material to be assembled, while providing the corresponding packaging with advantageous opening and resealing properties.

Furthermore, these hot-melt pressure-sensitive adhesive compositions, which are prepared by hot melting the ingredients thereof, additionally exhibit the advantage of being able to be put into the form of granules (with a size of between 1 and 10 mm) by means of a stage of extrusion carried out directly under hot conditions after the mixing stage, for example by means of a twin-screw extruder provided with a tool for cutting the extruded product.

By virtue of the granules thus obtained, the film, for example three-layer film, which is composed of the layer of hot-melt pressure-sensitive adhesive composition and of the two thin layers of thermoplastic polymer material to be assembled can be conveniently manufactured by coextrusion, by feeding in particular a blown film device with the constituent materials of the three layers in the form of granules having the size defined above.

However, in the context of the ongoing improvement in the packagings of foodstuffs provided by the industry to the consumer, it now appears increasingly necessary to consider the impact of the said packagings on a possible detrimental change in the organoleptic properties of the packaged foodstuffs and in particular on a risk of detrimental change in their taste and/or in their odour (or fragrance), in particular in the case of hermetic packagings.

As regards the hot-melt pressure-sensitive adhesive compositions for resealable packagings known from the prior art, it is considered that this impact can result from the presence in the said compositions of very small amounts—ranging up to a maximum limit of 5 ppm—of volatile organic compounds of low molar mass (less than 1000 Da) which originate from the impurities present in the starting materials: for example residues of the monomers or oligomers which are employed in the reactions for the polymerization of the styrene block copolymers or tackifying resins.

The risk thus cannot be ruled out of, in the final packaging, volatile organic compounds present in the form of traces in the hot-melt pressure-sensitive adhesive composition migrating through the layers of thermoplastic materials of the complex film to penetrate the foodstuff and to modify the organoleptic properties thereof. This risk can even less be ruled out if it is considered that some people, highly sensitive to odour and/or taste sensations, are capable of detecting traces ranging down to 1 ppb of certain substances.

Patent Application WO 14/020243 describes, for this same organoleptic problem, a hot-melt pressure-sensitive adhesive composition which is a constituent of a layer which bonds two thin layers of thermoplastic material, in a multilayer film, and which necessarily comprises a hydrophobic zeolite.

It is an aim of the present invention to provide another extrudable hot-melt pressure-sensitive adhesive composition than that described by this last patent application which makes it possible, without, however, requiring the presence of a hydrophobic zeolite, to confer, on the multilayer film of which it constitutes the adhesive layer, a reduced risk of detrimental change in the organoleptic properties of the packaged foodstuff and more particularly in its taste.

Another aim of the present invention is to provide an extrudable hot-melt pressure-sensitive adhesive composition exhibiting an improved homogeneity in appearance, including in the adhesive layer included in the multilayer film.

Another aim of the present invention is to provide an extrudable hot-melt pressure-sensitive adhesive composition and also a multilayer film which comprises two thin layers of thermoplastic materials bonded to one another by a layer of the said composition and which provides these two thin layers with opening and resealing properties which are suitable for the use of the said film for the manufacture of a resealable packaging.

Another aim of the present invention is to manufacture the said multilayer film by an industrial process for hot coextrusion of the constituent materials of each layer, such as blown film coextrusion, comprising the introduction of the said materials in the form of granules.

A subject-matter of the present invention is thus, first, a hot-melt pressure-sensitive adhesive composition a having a melt flow index (or MFI) ranging from 0.01 to 200 g/10 minutes and comprising, on the basis of the total weight of the said composition a:
  from 45 to 70% by weight of a composition a1 of styrene block copolymers comprising at least one elastomer block, the said composition a1 being composed, on the basis of its total weight:
    of 30 to 90% by weight of at least one diblock copolymer of Styrene-Isoprene (SI) type, and
    of 10 to 70% by weight of at least one Styrene-Isoprene-Styrene (SIS) linear triblock copolymer;
  the total content of styrene units of the said composition a1 varying from 10 to 40% by weight on the basis of the total weight of a1; and
    from 30 to 55% by weight of at least one tackifying resin a2 having a softening temperature of between 5 and 150° C. and obtained by a process comprising:
      a first stage of polymerization of a composition chosen from:
        a composition (i) essentially composed of unsaturated hydrocarbons having 9 carbon atoms, or
        a composition (ii) essentially composed of dicyclopentadiene and of its derivatives having 10 carbon atoms; then
      a second stage of hydrogenation of the polymer thus obtained.

This is because it has been found that the choice of the specific tackifying resin a2 combined with a choice of a styrene block copolymer of SIS/SI type makes it possible, surprisingly, to obtain a multilayer film which is suitable for the manufacture of resealable packagings for foodstuffs and which in addition makes it possible to lower the risk of detrimental change in the organoleptic properties of the packaged foodstuffs. Furthermore, the hot-melt pressure-sensitive adhesive composition according to the invention can be extruded, which makes it possible to present it in the form of granules with a size of between 1 and 10 mm, which is particularly advantageous for the manufacture of the corresponding multilayer film.

The above percentages and also those used generally in the present text to express amounts correspond, unless otherwise indicated, to weight/weight percentages. It is also specified that the percentages indicated above for the contents, in the composition a, of the composition a1 of block copolymers and of the tackifying resin a2 are percentages relating to the total weight of the said composition a. It is the same for the percentages indicated for the optional components included in the composition a which are specified subsequently in the present text.

The SI and SIS copolymers included in the composition a according to the invention have a weight-average molar mass $M_w$ of between 60 kDa and 400 kDA. Unless otherwise indicated, the weight-average molar masses $M_w$ which are given in the present text are expressed in daltons (Da) and are determined by Gel Permeation Chromatography, the column being calibrated with polystyrene standards.

According to a preferred alternative form of the hot-melt pressure-sensitive adhesive composition a according to the invention, the content of SI diblocks in the composition a1 of styrene block copolymers can vary from 50 to 80% and more preferably still from 55 to 80%.

According to yet another preferred alternative form, the total content of styrene units of the composition a1 of the styrene block copolymers can vary from 13 to 18%.

The copolymers of SIS and SI type which are capable of being employed for the preparation of the hot-melt pressure-sensitive adhesive composition a are commercially available. The said copolymers are themselves available in the form of triblock/diblock compositions. Kraton® D1113BT from Kraton and Quintac® 3520 from Zeon Chemicals are examples of such compositions.

Kraton® D1113BT is a composition for which the total content of styrene units is 16% and which is composed of 45% of SIS linear triblock copolymer with an $M_w$ of approximately 250 kDa and of 55% of SI diblock copolymer with an $M_w$ of approximately 100 kDa. Quintac® 3520 is a composition which is respectively composed of 22% and 78% of SIS linear triblock ($M_w$ approximately 300 kDa) and SI diblock ($M_w$ approximately 130 kDa) and for which the total content of styrene units is 15%.

The hot-melt pressure-sensitive adhesive composition a according to the invention comprises at least one (or more) tackifying resin a2. This resin a2 has a weight-average molar mass $M_w$ generally of between 300 and 5000 Da. The softening temperature (or point) of the tackifying resins which can be used in the composition a can vary from 5 to 150° C.

The softening temperature (commonly denoted in the art by the symbol R&B (Ring and Ball) is determined in accordance with the standardized test ASTM E 28, the principle of which is as follows. A brass ring with a diameter of approximately 2 cm is filled with the test resin in the molten state. After cooling to ambient temperature, the ring and the solid resin are placed horizontally in a thermostatically controlled bath of glycerol, the temperature of which can vary by 5° C. per minute. A steel ball with a diameter of approximately 9.5 mm is centred on the disc of solid resin. The softening temperature is—during the phase of rise in the temperature of the bath at a rate of 5° C. per minute—the temperature at which the disc of resin yields by a height of 25.4 mm under the weight of the ball.

A softening temperature of between 80 and 150° C. is more particularly preferred.

The process for obtaining the resin a2 is carried out, in a 1st stage, by polymerization of the constituent compounds of the compositions (i) or (ii), which are, for example, obtained from the distillation of naphtha. The unsaturated hydrocarbons of the composition (i) may or may not be aliphatic.

The hydrogenation of the polymer obtained is carried out according to known methods, resulting in partial or complete hydrogenation of the unsaturated bonds, preferably total hydrogenation.

Many resins corresponding to the definition of the resin a2 are commercially available. Mention may be made, as examples of such resins, of:

Regalite™ R1125, available from Eastman, which is a completely hydrogenated resin having a softening temperature of 125° C. and a weight-average molar mass $M_w$ of 1200 Da and which is obtained by polymerization of a composition (i) of unsaturated hydrocarbons having 9 carbon atoms;

Escorez™ 5340, available from ExxonMobil, which is a completely hydrogenated resin having a softening temperature of 140° C. and a weight-average molar mass $M_w$ of 680 Da and which is obtained by polymerization of a composition (ii);

Escorez™ 5400, available from ExxonMobil, which is a partially hydrogenated resin having a softening temperature of 100° C. and a weight-average molar mass $M_w$ of 570 Da and which is obtained by polymerization of a composition (ii).

Mention may also be made, as other examples of commercially available resins a2, of Regalite™ R1090 and R1100 from Eastman (respective R&B values of 90° C. and 100° C.), Arkon™ P90, Arkon™ P100 and Arkon™ P125, available from Arakawa (respective R&B values of 90° C., 100° C. and 125° C.), Escorez™ 5300 and Escorez™ 5380 from ExxonMobil (respective R&B values of 105° C. and 85° C. and respective $M_w$ values of 590 and 460 Da) and Sukorez™ SU90, Sukorez™ SU100 and Sukorez™ SU 120 from Kolon (respective R&B values of 90° C., 100° C. and 120° C.).

According to a preferred alternative form, the hot-melt pressure-sensitive adhesive composition a according to the invention comprises from 50 to 70% of the composition a1 and from 30 to 50% of the tackifying resin (or resins) a2.

According to another preferred alternative form, the composition a is essentially composed of the composition a1 and of the tackifying resin a2 in amounts within the ranges specified above.

The term "essentially composed" is understood to mean that, apart from the composition a1 and the tackifying resin (or resins) a2, the composition a also includes one or more optional components but in an amount not exceeding 5% and preferably 2%.

Such optional components, the content of which in the composition a can range from 0.1 to 2%, are, for example, stabilizers (or antioxidants). These compounds are introduced in order to protect the composition from decomposition resulting from reaction with oxygen which is capable of being formed by the action of heat, light or residual catalysts on certain starting materials, such as tackifying resins. These compounds can include primary antioxidants, which trap free radicals and are generally substituted phenols, such as Irganox® 1010 from CIBA. The primary antioxidants can be used alone or in combination with other antioxidants, such as phosphites, for example Irgafos® 168, also from CIBA, or also with UV stabilizers, such as amines.

Mention may also be made, as example of such optional components, of a plasticizer, the content of which in the composition a does not exceed 5%. Use may be made, as plasticizer, of a paraffinic and naphthenic oil (such as Primol® 352 from Esso) optionally comprising aromatic compounds (such as Nyflex 222B).

Finally, other examples of such optional components are inorganic or organic fillers, pigments or dyes.

The melt flow index (MFI) of the hot-melt pressure-sensitive adhesive composition a is measured at 190° C. and for a total weight of 2.16 kg, in accordance with condition d) of Standard ISO 1133. The MFI is the weight of composition (placed beforehand in a vertical cylinder) which flows in 10 minutes through a die having a fixed diameter, under the effect of a pressure exerted by a loaded piston having a total weight of 2.16 kg. Unless otherwise mentioned, the MFI values indicated in the present text were measured under these same conditions.

The hot-melt pressure-sensitive adhesive compositions having an MFI ranging from 2 to 70 g/10 minutes are more particularly preferred.

According to an alternative form very particularly preferred for the purpose of the manufacture of the multilayer film, the composition a according to the invention is provided in the form of granules with a size of between 1 and 10 mm, preferably between 2 and 5 mm.

The composition a can be prepared in this form by a process which comprises:

a simple stage of mixing the ingredients under hot conditions, between 150 and 200° C., preferably at approximately 160° C., by means of a twin-screw extruder provided with a tool for cutting the extruded product at the outlet of the die, then a stage of cooling, for example at ambient temperature.

A subject-matter of the present invention is, secondly, a multilayer film comprising two thin layers B and C of thermoplastic material bonded together by an adhesive layer A, characterized in that the said layer A has a thickness of between 7 and 50 µm and is composed of the hot-melt pressure-sensitive adhesive composition a as defined above.

The adhesive layer A preferably provides the bonding between a laminatable thin layer B and a sealable and cleavable thin layer C.

The thickness of the adhesive layer A is preferably between 7 and 35 µm and more preferably still between 7 and 25 µm.

According to another preferred alternative form, the thickness of the layer A can also be between 10 and 35 µm or better still between 10 and 25 µm.

The laminatable layer B can be laminated with other layers for the preparation of the packaging, for example with a rigid layer for the preparation of the receptacle.

The sealable and cleavable layer C makes it possible to provide, at the perimeter along which the receptacle is bonded by welding to the seal, the first opening of the packaging, by means of a cleavable embrittled region. After opening, the embrittled region results in the appearance of:

the mother adhesive layer on the sealing band and/or on the receptacle band which were in contact in the closed packaging, and/or two daughter adhesive layers which result from the rupturing of the mother adhesive layer and which are located on the sealing band and/or the receptacle band.

The material which can be used to form the two layers B and C is generally a thermoplastic polymer (identical or different for the two layers), such as:

polyethylene (PE),
polypropylene (PP),
a copolymer based on ethylene and propylene,
polyamide (PA),
polyethylene terephthalate (PET), or also
an ethylene-based copolymer, such as, for example, a copolymer grafted with maleic anhydride, a copolymer of ethylene and vinyl acetate (EVA), a copolymer of ethylene and vinyl alcohol (EVOH), or a copolymer of ethylene and an alkyl acrylate, such as methyl acrylate (EMA) or butyl acrylate (EBA), polystyrene (PS), polyvinyl chloride (PVC), polyvinylidene fluoride (PVDF), a lactic acid polymer (PLA), or polyhydroxyalkanoate (PHA).

It is preferable to use, to form the two layers B and C, a polyolefinic material, very particularly PE and more preferably still a low density PE (also denoted by the name of Low Density PolyEthylene or LDPE).

The thickness of the layers B and C is capable of varying within a wide range extending from 5 to 150 μm.

According to a preferred alternative form, the multilayer film according to the invention comprises, in addition to the layers A, B and C, two tie layers D and E such that the adhesive layer A is:

connected to the layer B via the layer D, and connected to the layer C via the layer E.

The tie layers D and E are also denoted by the name of "intermediate layers" and generally have a thickness of between 1 and 10 μm, preferably between 2 and 8 μm. The use of such tie layers advantageously makes it possible to improve the quality of the resealing of the multilayer film and thus of the corresponding resealable packaging, thus providing the consumer with more effective storage of the remaining portion of the perishable foodstuff present in the packaging, after the latter has been opened for the first time.

The tie layers D and E are respectively composed of compositions d and e, which are identical or different, which have a melting point from approximately 80 to 120° C. and essentially comprise polymers chosen from:

ethylene homopolymers or copolymers, propylene homopolymers or copolymers, copolymers of ethylene with a polar comonomer, and grafted olefin homopolymers or copolymers.

Reference is made, for further information with regard to these compositions d and e, to Patent Application US2013/0029553.

Preferably, the compositions d and e each comprise a polyethylene or polypropylene modified by a cyclic anhydride of an unsaturated dicarboxylic acid having from 4 to 8 carbon atoms.

Maleic anhydride is a very particularly preferred cyclic anhydride.

"Polyethylene modified" by the said anhydride is intended to denote either a copolymer of ethylene and the said anhydride or an ethylene homopolymer or copolymer grafted by the said anhydride.

According to another alternative embodiment, the multilayer film according to the invention comprises, in addition to the three essential layers A, B and C and the two optional layers D and E, other thin layers necessary for the preparation of the packaging, such as, for example:

a rigid layer necessary for the mechanical strength of the receptacle, or a printable layer, or a layer having a barrier effect against oxygen, water vapour or else carbon monoxide.

The materials which can be used to form the said layers can be identical or different and generally comprise thermoplastic polymers which can be chosen from the polymers mentioned above for the layers B and C.

According to an alternative embodiment, the multilayer film according to the invention is a film comprising three layers consisting of the adhesive layer A and the two layers B and C, according to the sequence B/A/C in which the "/" sign means that the faces of the layers concerned are in direct contact.

According to another alternative embodiment, the multilayer film according to the invention is a film comprising five layers consisting of the adhesive layer A, the two intermediate layers D and E and the two external layers B and C, according to the sequence B/D/A/E/C in which the "/" sign means that the faces of the layers concerned are in direct contact.

The present invention also relates to a process for the manufacture of the multilayer film as defined above, characterized in that it comprises a stage of coextrusion of the hot-melt pressure-sensitive adhesive composition a and of the constituent materials of the layers B and C and, if appropriate, of the layers D and E.

Preferably, the constituent compositions and materials of the layers A, B, C and, if appropriate, D and E are fed into the coextrusion device in the form of granules with a size of between 1 and 10 mm, preferably between 2 and 5 mm. Thus, the pressure-sensitive adhesive composition a employed in the multilayer film according to the invention makes it possible, particularly advantageously, to provide both the properties required for the said film and the possibility of a presentation of the said composition a in the form of the abovementioned granules. The other layers possibly included in the multilayer film can be obtained either by the incorporation, in the coextrusion device, of the corresponding constituent materials in the form of granules of the same size (such as, for example, for the tie layers D and E) or by a process of laminating the film directly resulting from the coextrusion, for example employing a polyurethane-based adhesive.

The coextrusion device employed in the manufacturing process is preferably a bubble blowing coextrusion device (also known under the name of "blown film coextrusion device"). In a way known to a person skilled in the art, this process comprises:

the melting, in separate extruders, of the constituent compositions and materials of the layers A, B and C and also, if appropriate, D and E, then the passing of the corresponding streams through an assembly of annular and concentric dies, so as to form a tubular bubble comprising several layers, in the order corresponding to that desired for the final structure, then the radial expansion (relative to the annular die) and the drawing (in the axial direction) of the bubble, then the cooling of the bubble.

The geometrical characteristics of the dies, as well as the parameters of the process, such as the degree of radial expansion and the drawing rate, are set so as to obtain the thicknesses desired for the various constituent layers of the multilayer film. Reference is made in particular, for a further description of the bubble blowing coextrusion process, to Patent Application US2013/0029553.

The present invention also relates to the use of the multilayer film as described above for the manufacture of resealable packagings.

The use for the manufacture of resealable cartons is particularly advantageous and, according to a particularly preferred embodiment, for the manufacture of the sealing film of these cartons.

The following examples are given purely by way of illustration of the invention and should not under any circumstances be interpreted as limiting the scope thereof.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 14.56561, filed Jul. 8, 2014, are incorporated by reference herein.

EXAMPLE A

Reference

1. Preparation of a Hot-Melt Pressure-Sensitive Adhesive Composition a

The adhesive composition shown in the following Table is prepared in the form of granules with a size of approximately 4 mm by mixing its ingredients at 160° C. using a twin-screw extruder, extruding through a die, then cutting up the extruded product and cooling to ambient temperature.

The MFI measured is 57 g/10 minutes.

2. Preparation of a Three-Layer B/A/C Film Comprising a Layer A of the Composition of Example A This three-layer film is manufactured using a bubble blowing coextrusion pilot-scale device operated continuously, in which three extruders are fed:
  for one, with the composition a of Example A, and
  for the other two, with LDPE;
the three compositions being in the form of granules with a size of approximately 4 mm.

The parameters of the process are adjusted so as to manufacture a three-layer film composed:
  as layer A, of a layer with a thickness of 15 μm consisting of the composition of Example A,
  as laminatable thin layer B, of a layer with a thickness of 30 μm consisting of LDPE;
  as sealable and cleavable thin layer C, of a layer with a thickness of 15 μm also consisting of LDPE.

Mention may be made, among the parameters normally fixed, of a degree of radial expansion of the bubble equal to 3, a drawing rate of 7 m/minute and an overall throughput of 11 kg/hour.

The three-layer film thus obtained has a total thickness of 60 μm and a length of 50 m and is packaged in the form of a reel with a machine width of 250 mm.

Measurement of the Force of First Opening by T-Peeling at 23° C.:

A sample in the form of a rectangular sheet with A4 format (21×29.7 cm) is cut out from the three-layer film thus obtained.

The external face of the laminatable layer B of this sample is:
  in a first step, subjected to a corona surface treatment (using a plasma), then
  in a second step, laminated to a PET film with a thickness of 23 μm using a polyurethane-based solvent-based adhesive and using a coating device of the Mayer bar type.

The rectangular sheet is then placed under a press for 24 h.

The said rectangular sheet is then folded along a line located in its middle and parallel to the small side of the rectangle, resulting in the sealable and cleavable layer C being brought into contact with itself.

Partial sealing is then carried out using two heating clamping jaws at 130° C. applied under a pressure of 6 bar for 1 second, so as to obtain sealed regions of rectangular shape (8 cm in length and 1 cm in width) positioned perpendicularly to the folding line. Each sealed region is cut out in order to obtain a tensile test specimen in which the sealed region with a length of 8 cm is extended (at that of its ends which is opposite the folding line) by two strips of approximately 2 cm in length left free and unsealed.

These two free strips are attached to two holding devices (known as jaws) respectively connected to a stationary part and a movable part of a tensile testing device which are located on a vertical axis. This tensile testing device is a dynamometer.

While a drive mechanism imparts a uniform rate of 300 mm/minute to the movable part, resulting in the peeling of the two sealed layers, the ends gradually move along a vertical axis with the formation of an angle of 180°. A force sensor connected to the said movable part measures the force withstood by the test specimen thus held. The measurement is carried out in a climate-controlled chamber maintained at a temperature of 23° C.

The force obtained is shown in the Table.

Measurement of the Force of Second Opening by T-Peeling at 23° C.:

The two parts of the preceding test specimen are, after peeling, repositioned facing one another and brought into contact manually. They are then subjected to a pressure exerted by means of a roller with a weight of 2 kg, with which a to-and-fro movement is carried out along a direction parallel to the length of the test specimen.

A tensile test specimen is thus obtained which is identical in shape to that prepared for the preceding peel test, which is then repeated.

The force obtained is shown in the Table.

Test for Evaluating the Detrimental Change in the Taste of Butter Brought into Contact with the Adhesive Composition:

This test is carried out on a 125 g block of butter having dimensions of 110×65×17 mm.

This block is centred horizontally on a rectangle having dimensions of 110×65 mm cut out from the sheet of three-layer film with the A4 format mentioned above, the block being in contact with the sealable and cleavable layer C of the said film.

The upper face of the block of butter is subsequently covered with a second rectangle of three-layer film identical to the first, and is also in contact with the sealable and cleavable layer C.

The structure thus obtained is overwrapped in tinfoil and then placed for 10 days in a refrigerator maintained at 10° C.

As control, a block of butter identical to the preceding one, which is simply wrapped in tinfoil, is also stored in the same refrigerator for the same time.

After 10 days, the two blocks of butter are recovered, are each cut up into 20 pieces weighing approximately 6 g and are passed on to a panel of ten people for evaluation of the taste. Each member of the panel assigns, after tasting, a grade of 0 to 4 to the pieces resulting from the block brought into contact with the three-layer film comprising the adhesive layer A, in comparison with the pieces resulting from the control block, according to the following scale:
0=no perceptible difference
1=barely perceptible difference
2=slight difference
3=marked difference
4=strong difference.
The mean grade obtained is shown in the Table.

EXAMPLES 1 AND 2

According to the Invention

Example A is repeated with the compositions a shown in the Table.

The MFI obtained for each composition a and the forces measured for the 1st and 2nd opening are shown in the Table, along with the results of the tests for evaluating the detrimental change in the taste of the butter.

It is observed that the force of 1st opening remains substantially stable with respect to that measured for the reference Example A. On the other hand, the force of 2nd opening is lowered but is assessed as corresponding to a quality of resealing (following the first opening of the packaging) which is still acceptable.

Furthermore, the detrimental change in the taste of the butter resulting from the composition a is very significantly reduced in comparison with Example A.

TABLE

| | | Content as % weight/weight | | |
|---|---|---|---|---|
| | Ingredient | Example A (ref.) | Example 1 | Example 2 |
| Composition a | Kraton ® D1113BT | 59.7 | 39.8 | 39.8 |
| | Quintac ® 3520 | — | 19.9 | 19.9 |
| | Escorez ® 1310LC | 24.9 | — | — |
| | Regalite ® R1125 | — | 39.8 | — |
| | Escorez ® 5340 | — | — | 39.8 |
| | Dercolyte ® S115 | 14.9 | — | — |
| | Irganox ® 1010 | 0.5 | 0.5 | 0.5 |
| Composition a1 | Content of styrene units (as % weight/weight) | 16 | 16 | 16 |
| | Content of diblocks (as % weight/weight) | 56 | 63 | 63 |
| Composition a Three-layer film | MFI (in g/10 min) | 57 | 56 | 56 |
| | Force of 1st opening (in N/cm) | 3 | 2.8 | 3.1 |
| | Force of 2nd opening (in N/cm) | 0.84 | 0.5 | 0.6 |
| | Detrimental change in the taste of the butter | 0.4 | 0.2 | 0.1 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A hot-melt pressure-sensitive adhesive composition a having a melt flow index ranging from 0.01 to 200 g/10 minutes and comprising, on the basis of the total weight of the said composition, a:

from 45 to 70% by weight of a composition a1 of styrene block copolymers comprising at least one elastomer block, the said composition a1 comprising, on the basis of its total weight:
of 30 to 90% by weight of at least one Styrene-Isoprene (SI) diblock copolymer, and
of 10 to 70% by weight of at least one Styrene-Isoprene-Styrene (SIS) linear triblock copolymer;
the total content of styrene units of the said composition a1 varying from 10 to 40% by weight on the basis of the total weight of a1; and
from 30 to 55% by weight of at least one tackifying resin a2 having a softening temperature of between 5 and 150° C. and obtained by a process comprising:
a first stage of polymerization of a composition:
a composition (i) comprising unsaturated hydrocarbons having 9 carbon atoms, or
a composition (ii) comprising dicyclopentadiene or its derivatives having 10 carbon atoms; then
a second stage of hydrogenation of the polymer thus obtained, the polymer being completely hydrogenated.

2. The hot-melt pressure-sensitive adhesive composition according to claim 1, having a content of SI diblocks in the composition a1 of 50 to 80%.

3. The hot-melt pressure-sensitive adhesive composition according to claim 1, wherein the softening temperature of the tackifying resin a2 is between 80 and 150° C.

4. The hot-melt pressure-sensitive adhesive composition according to claim 1, consisting of the composition a1 and of a tackifying resin a2.

5. The hot-melt pressure-sensitive adhesive composition according to claim 1, having a melt flow index ranges from 2 to 70 g/10 minutes.

6. The hot-melt pressure-sensitive adhesive composition according to claim 1, provided in the form of granules with a size of between 1 and 10 mm.

7. A multilayer film comprising two layers B and C of thermoplastic material bonded together by an adhesive layer A, wherein layer A has a thickness of between 7 and 50 μm and comprises the hot-melt pressure-sensitive adhesive composition a as defined in claim 1.

8. The multilayer film according to claim 7, having a thickness of the adhesive layer A of 7 to 35 μm.

9. The multilayer film according to claim 7, comprising, in addition to the layers A, B and C, two tie layers D and E such that the adhesive layer A is:
connected to the layer B via the layer D, and
connected to the layer C via the layer E.

10. The multilayer film according to claim 9, wherein the tie layers D and E are compositions d and e, which are identical or different, which have a melting point from approximately 80 to 120° C. and comprise:
ethylene homopolymers or copolymers,
propylene homopolymers or copolymers,
copolymers of ethylene with a polar comonomer, or
grafted olefin homopolymers or copolymers.

11. A three-layer film according to claim 7, consisting of the adhesive layer A and the two layers B and C, according to the sequence B/A/C in which the "/" sign means that the faces of the layers concerned are in direct contact.

12. A film comprising five layers according to claim 9, consisting of the adhesive layer A, the two intermediate layers D and E and the two external layers B and C, according to the sequence B/D/A/E/C in which the "/" sign means that the faces of the layers concerned are in direct contact.

13. A process for the manufacture of the multilayer film as defined in claim 7, comprising coextruding the hot-melt pressure-sensitive adhesive composition a and constituent materials of the layers B and C and, optionally, of the layers D and E.

14. The manufacturing process according to claim 13, wherein the constituent compositions and materials of the layers A, B, C and optionally D and E, are fed into the coextrusion device in the form of granules with a size of 1 to 10 mm.

15. The process for the manufacture of the multilayer film according to claim 13, wherein a coextrusion device that is a bubble blowing coextrusion device is employed.

16. A resealable packaging, comprising the multilayer film as defined in claim 7.

17. A multilayer film comprising two layers B and C of thermoplastic material bonded together by an adhesive layer A, wherein layer A has a thickness of between 7 and 25 μm and comprises the hot-melt pressure-sensitive adhesive composition a as defined in claim 1.

18. A resealable packaging, comprising the multilayer film as defined in claim 17.

19. The hot-melt pressure-sensitive adhesive composition according to claim 1, wherein the second stage of hydrogenation of the polymer achieves the reduction of the amount of residual monomers and/or oligomers which were employed in the reactions for the polymerization, and thereby achieves the lowering of risk of detrimental change in taste and/or odor of a foodstuff in contact with a multilayer film comprising two layers B and C of thermoplastic material bonded together by an adhesive layer A, wherein layer A has a thickness of between 7 and 50 μm and comprises said hot-melt pressure-sensitive adhesive composition.

* * * * *